(12) United States Patent
Cisse et al.

(10) Patent No.: US 9,137,307 B2
(45) Date of Patent: Sep. 15, 2015

(54) SEARCHING AND RETRIEVING FILES IN COMPUTER NETWORKS

(75) Inventors: Jean-Christophe Cisse, Issy-les-Moulineaux (FR); Gilles Teyssieux, Issy-les-Moulineaux (FR)

(73) Assignee: AddOnMail, Issy-les-Moulineaux (FR)

( * ) Notice: Subject to any disclaimer, the term of this patent is extended or adjusted under 35 U.S.C. 154(b) by 549 days.

(21) Appl. No.: 12/687,628

(22) Filed: Jan. 14, 2010

(65) Prior Publication Data

US 2011/0173158 A1    Jul. 14, 2011

(51) Int. Cl.
*G06F 17/30* (2006.01)
*H04L 29/08* (2006.01)

(52) U.S. Cl.
CPC .................. *H04L 67/1063* (2013.01)

(58) Field of Classification Search
CPC ............... G06F 17/30067; G06F 17/30696
USPC ............. 707/640, 999.204; 709/220, 223
See application file for complete search history.

(56) References Cited

U.S. PATENT DOCUMENTS

| | | | |
|---|---|---|---|
| 6,226,649 B1 * | 5/2001 | Bodamer et al. | 709/203 |
| 6,516,356 B1 | 2/2003 | Belknap et al. | |
| 6,636,521 B1 | 10/2003 | Giulianelli | |
| 7,185,192 B1 | 2/2007 | Kahn | |
| 7,228,383 B2 * | 6/2007 | Friedman et al. | 711/118 |
| 2003/0204536 A1 * | 10/2003 | Keskar et al. | 707/200 |
| 2008/0162817 A1 | 7/2008 | Batterywala | |
| 2009/0132537 A1 | 5/2009 | Denton | |
| 2010/0030814 A1 * | 2/2010 | Wong et al. | 707/200 |
| 2010/0070538 A1 * | 3/2010 | Spinelli et al. | 707/802 |
| 2013/0246338 A1 * | 9/2013 | Doddapaneni | 707/602 |

* cited by examiner

*Primary Examiner* — Monica Pyo

(74) *Attorney, Agent, or Firm* — Withers Bergman LLP; Alan Gardner

(57) ABSTRACT

The specification and drawings present a new method, apparatus and software related product (e.g., computer readable medium) presented for: reading all multi-application files stored in network devices (i.e., in servers, workstations, archives, backup repositories, etc.) comprised in a computer network or reading selected multi-application files comprising one or more predefined features and stored in said network devices using a generic application programming interface (GAPI), followed by creating and/or updating (e.g., periodically) meta-data for the files read by using the GAPI, and/or followed by retrieving requested files out of the multi-application files using the meta-data for the requested files (if the meta-data is created and properly updated).

27 Claims, 7 Drawing Sheets

SEARCHING AND RETRIEVING FILES IN COMPUTER NETWORKS

CROSS-REFERENCE TO RELATED APPLICATION

This application discloses subject matter which is also disclosed and which may be claimed in co-pending, co-owned application Ser. No. 12/687,667, filed, Jan. 14, 2010, on even date herewith.

TECHNICAL FIELD

The present invention relates generally to computer networks and, more specifically, to searching and retrieving files stored in network devices of the computer networks.

BACKGROUND ART

Currently, there is no universal method for reading/searching and retrieving files in computer networks (e.g., to perform e-discovery). Accessing/reading data stored in different network devices (e.g., servers, workstations, archives, backup repositories, etc.) is a complicated, lengthy and application dependent process based on existing art. The challenges which are currently not addressed by existing technologies include but are not limited to: a) reading/retrieving files created by different software applications; b) quickly retrieving and creating database out of files having desired properties; c) processing erased files; d) simultaneous searching and retrieving desired files; etc.

DISCLOSURE OF THE INVENTION

According to a first aspect of the present invention, a method comprises: reading in a computer network by an access network computer all files or selected files comprising one or more predefined features out of a plurality of files created using two or more applications and stored in a plurality of network devices comprised in the computer network using a generic application programming interface configured to read the plurality of files using the two or more applications, the generic application programming interface being comprised in the access network computer for further performing using the access network computer one or more of: creating or updating meta-data for the all files or the selected files comprising one or more predefined features, retrieving the all files or the selected files comprising one or more predefined features, and viewing on a display one or more files out of the all files or the selected files comprising one or more predefined features, or the meta-data if created.

In further accord with the first aspect of the invention, the retrieving the all files or the selected files comprising one or more predefined features may be performed: by using the meta-data if the meta-data is already created and updated within a predetermined time period, or by creating or updating the meta-data if the meta-data is not created or not updated within a predetermined time period.

Still according to the first aspect of the invention, the method may further comprise: storing the meta-data in the access network computer, wherein the reading, creating or updating are performed by the access network computer if the meta-data for the all files or the selected files was not previously created or updated within a predetermined time period. Still further, the predetermined time period may be 24 hours.

According still further to the first aspect of the invention, the reading the all or the selected files and the creating or updating meta-data for the read files may be performed by the access network computer in response to a request to create or update the meta-data for the all or the selected files comprising one or more predefined features communicated to the access network computer through a user interface.

Still further according to the first aspect of the invention, the reading the all or the selected files and the creating or updating meta-data for the read files may be performed as a default without any request, wherein the updating may be performed periodically with a predetermined time period.

Further still according to the first aspect of the invention, the access network computer may be configured to process erased files.

In further accordance with the first aspect of the invention, the network devices comprised in the computer network may be one or more of: workstations, servers, archiving storage devices, and backup storage devices.

Yet further still according to the first aspect of the invention, the meta-data may comprise one or more characterization records of the all files or the selected files indicating for each file of the all files or the selected files one or more of: a location of a file, a content, an author, and further indicating for the each file, if the each file is an e-mail, one or more of: an originator address, a recipient address, having attachment or not, and wherein the characterization records comprise one or more of: at least one index of content of the each file, one or more summaries using selected characteristics and at least one aggregated summary combining the one or more summaries.

According further to the first aspect of the invention, the selected files may be e-mails.

According still further to the first aspect of the invention, the method may further comprise: receiving a request to retrieve the selected files comprising one or more predefined features communicated, the request being communicated to the access network computer through a user interface; and retrieving the selected files by the access network computer in response to the request based on the meta-data which is created and updated within a predetermined period of time, and using the generic application programming interface to perform one or both of: to store the selected files in a memory comprised in the access network computer, and send the selected files to a requested destination in the computer network or to an outside computer network.

According yet further to the first aspect of the invention, the method may further comprise: receiving a request to retrieve the selected files comprising the one or more predefined features for backup or archiving and communicated to the access network computer through a user interface; retrieving the selected files by the access network computer in response to the request based on the meta-data which is created and updated within a predetermined period of time, and using the generic application programming interface; storing the selected files in repositories comprised in the computer network; and updating the meta-data for the selected files.

Further still according to the first aspect of the invention, the two or more applications may be MICROSOFT OUTLOOK, EUDORA, MOZILLA THUNDERBIRD and IBM LOTUS NOTES.

According to a second aspect of the invention, an access network computer comprises: a generic application programming interface, configured to provide reading in a computer network all files or selected files comprising one or more predefined features out of a plurality of files created using two or more applications and stored in a plurality of network devices comprised in the computer network, the generic application programming interface being configured to read the plurality of files using the two or more applications, for further performing by the access network computer using the reading one or more of: creating or updating meta-data for the all files or the selected files comprising one or more predefined features, retrieving the all files or the selected files comprising one or more predefined features, and viewing one or more files out of the all files or the selected files comprising one or more predefined features.

According further to the second aspect of the invention, the access network computer may further comprise: a meta-data creating and updating module, configured to create or update meta-data for files out of the all or selected files which are read using the application programming interface, if the meta-data for the files was not previously created or if the meta-data for the files was not updated within a predetermined time period; and a meta-data memory, configured to store the meta-data. Still further, the predetermined period of time may be 24 hours.

Still further according to the second aspect of the invention, the access network computer may further comprise: a user interface, configured to receive a request to create or update the meta-data for the all files or the selected files comprising one or more predefined features; a search and detect module, responsive to the request, configured to determine if the meta-data for the selected files was not previously created or was not updated within a predetermined time period, and, if the meta-data for the selected files was not previously created or updated within the predetermined time period, configured to provide the request further to the generic application programming interface for reading the all files or the selected files to create or update the meta-data for the all or selected files.

Further still in accordance with the second aspect of the invention, the access network computer may be configured to create the meta-data for all files or selected files comprising one or more predefined features out of the plurality of files or update the meta-data for the all files or the selected files comprising one or more predefined features periodically every predetermined time period using reading by the generic application programming interface the all files or selected files comprising one or more predefined features as a default without any request.

In further accordance with the second aspect of the invention, the access network computer may be configured to process erased files.

Yet further still according to the second aspect of the invention, the network devices comprised in the computer network may be one or more of: workstations, servers, archiving storage devices, and backup storage devices.

According further to the second aspect of the invention, the meta-data may comprise one or more characterization records of the all files or the selected files indicating for each file of the all files or the selected files one or more of: a location of a file, a content, an author, and further indicating for the each file, if the each file is an e-mail, one or more of: an originator address, a recipient address, having attachment or not, and wherein the characterization records comprise one or more of: at least one index of content of the each file, one or more summaries using selected characteristics and at least one aggregated summary combining the one or more summaries.

According still further to the second aspect of the invention, the selected files may be e-mails.

According yet further to the second aspect of the invention, the access network computer may further comprise: a retrieve module, responsive to a request to retrieve the selected files comprising the one or more predefined features communicated to the access network computer through a user interface; configured to provide retrieving of the selected files by the access network computer in response to the request based on the meta-data which is created and updated within a predetermined period of time and using the generic application programming interface, and further configured to send the selected files after being retrieved to a further destination; and a retrieved files storage memory, configured to store the selected files after being retrieved.

Further still according to the second aspect of the invention, the access network computer may further comprise: a backup and archive module, responsive to a request to retrieve the selected files comprising the one or more predefined features for backup or archiving and communicated to the access network computer through a user interface, and configured to provide retrieving of the selected files by the access network computer in response to the request based on the meta-data which is created and updated within a predetermined period of time and using the generic application programming interface for providing the selected files for storing to an archive and backup repositories located in the computer network but outside of the access network computer.

Yet still further according to the second aspect of the invention, the two or more applications may be MICROSOFT OUTLOOK, EUDORA, MOZILLA THUNDERBIRD and IBM LOTUS NOTES.

According to a third aspect of the present invention, a computer readable medium encoded with a computer program comprising computer readable instructions recorded thereon for execution a method comprising: reading in a computer network by an access network computer all files or selected files comprising one or more predefined features out of a plurality of files created using two or more applications and stored in a plurality of network devices comprised in the computer network using a generic application programming interface configured to read the plurality of files using the two or more applications, the generic application programming interface being comprised in the access network computer for further performing by the access network computer using the reading one or more of: creating or updating meta-data for the all files or the selected files comprising one or more predefined features, retrieving the all files or the selected files comprising one or more predefined features, and viewing on a display one or more files out of the all files or the selected files comprising one or more predefined features, or the meta-data if created.

In further accord with the third aspect of the invention the method may further comprise: storing the meta-data in the access network computer, wherein the reading, creating or updating are performed if the meta-data for the all files or the selected files was not previously created or updated within a predetermined time period.

BRIEF DESCRIPTION OF THE DRAWINGS

For a better understanding of the nature and objects of the present invention, reference is made to the following detailed description taken in conjunction with the following drawings, in which.

MODES FOR CARRYING OUT THE INVENTION

Figure 1:
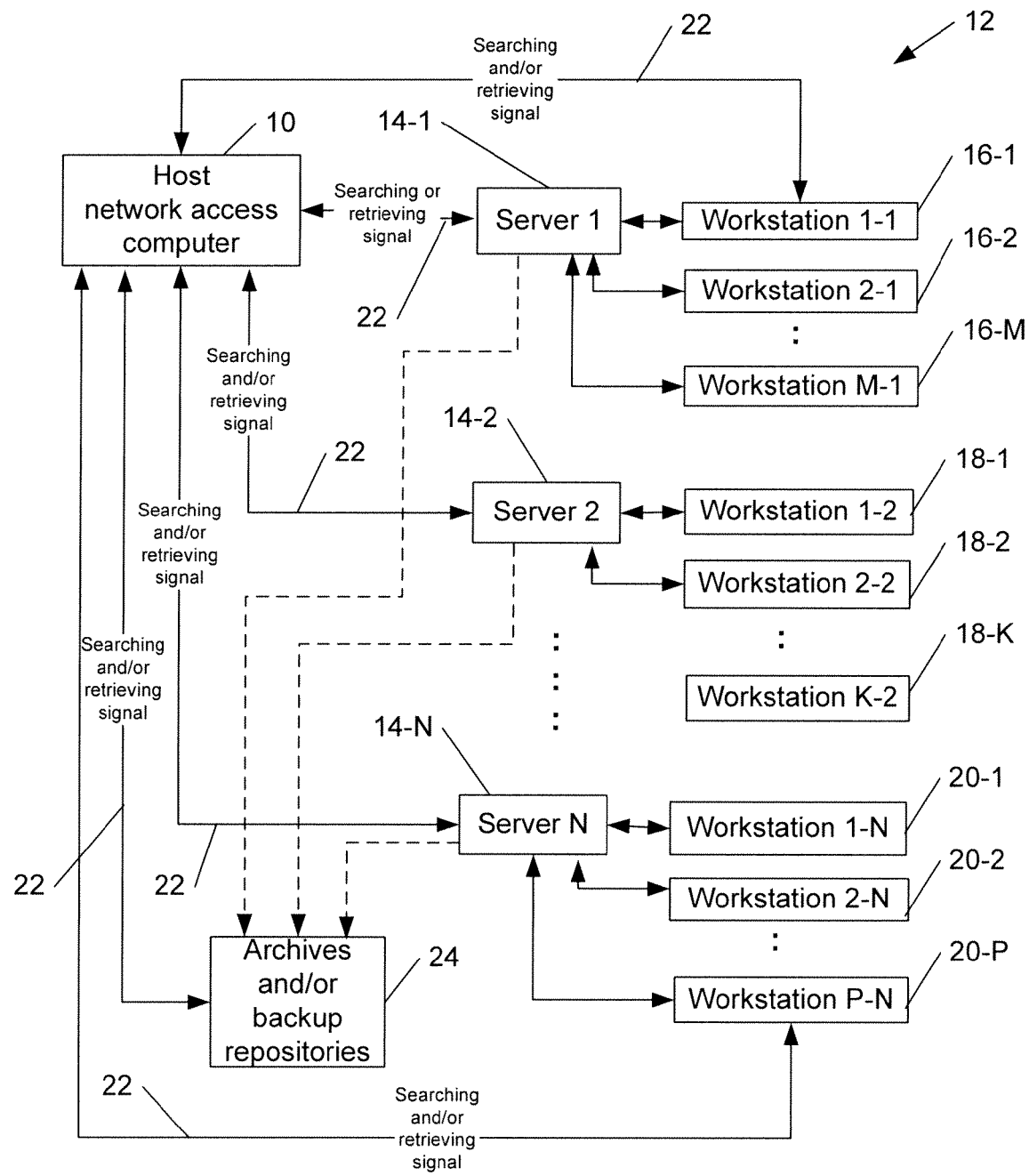
FIG. 1 is a block diagram of a computer network comprising an access network computer for implementing embodiments of the present invention.

A new method, apparatus and software related product (e.g., computer readable medium) are presented for: reading all multi-application files (i.e., files created by two or more applications) stored in network devices (i.e., in servers, workstations, archives, backup repositories, etc.) comprised in a computer network or reading selected multi-application files (i.e., selected from the all files) comprising one or more predefined features and stored in said network devices using a generic application programming interface (GAPI), followed by creating and/or updating (e.g., periodically) meta-data for the files read by using the GAPI, and/or followed by retrieving requested files out of the multi-application files using the meta-data for the requested files (if the meta-data is created and properly updated) through GAPI. Also one or more of the read files out of the multi-application files and the meta-data may be viewed on a display, if requested. The reading of the multi-application files, creating and updating meta-data and retrieving requested files and viewing the one or more files may be performed using one or more dedicated computers, e.g., access network computer(s) comprised in the computer network and comprising the GAPI. The multi-application files (i.e., files created by two or more applications) may be created using a plurality known applications which may include (but are not limited to), e.g., MICROSOFT OUTLOOK, EUDORA, MOZILLA THUNDERBIRD, IBM LOTUS NOTES, MAIL FOR MAC OS X, any software for e-mail that uses MBOX formats to store local e-mails, etc.

According to one embodiment of the present invention, the reading of the multi-application all or selected files in the network devices may be performed by the access network computer, for example, in response to a request for creating or updating the meta-data for the all files or for the selected files comprising one or more predefined features, wherein this request may be communicated to the access network computer, e.g., through a user interface. Then the created or updated meta-data may be created or updated by the access network computer and stored in the access network computer, wherein the steps of reading, creating or updating may be performed by the access network computer if the meta-data for the all files or the selected files was not previously created or updated within a predetermined time period (e.g., 24 hours period).

Alternatively, according to another embodiment, the reading of the all or the selected files comprising one or more predefined features and creating or updating meta-data for the read files may be performed as a default without any request, wherein steps of reading the files and updating the meta-data for these files may be performed periodically with a predetermined time period.

According to a further embodiment, the GAPI may provide a variety of options for reading/detecting the desired files. For example, in a fast search option the e-mail files may be detected by the GAPI without even opening the e-mail files, and may provide relevant information for creating the meta-data. In a more advanced search the files may be opened by the GAPI to read its content. Moreover, the GAPI may be able to detect e-mail files whose extensions have been changed (thus these files cannot be read using original e-mal application used for creating the file). Furthermore, the access network computer may be configured to process erased files using generic application programming interface, as further described herein.

Moreover, according to a further embodiment, the created or updated meta-data may comprise one or more characterization records of the all files or of the selected files stored in the network devices possibly indicating for each of the all or of selected files, e.g., a location of a file, a content, an author, etc. The characterization record may further indicate for e-mail files an originator address, an addressee address, having attachment or not, etc. Furthermore, characterization records may comprise at least one index of content of files, one or more summaries using selected characteristics, and at least one aggregated summary combining said one or more summaries. The selected characteristics may be, for example, messages containing "AddOnMail" in the subject line, messages having an attachment or and an attachment with a specific name, messages received from a specified e-mail address, etc.

Furthermore, according to one more embodiment, retrieving upon request the all files or the selected files comprising one or more predefined features from the network devices may be performed: using the meta-data if it is already created and updated within a predetermined time period for the files requested to be retrieved. Alternatively, if the meta-data is not created or not updated within a predetermined time period before the request, then said meta-data for the requested files may be created or updated. The retrieving of the requested files may be implemented then using the meta-data (available, created or updated) for the requested files.

According to another embodiment, the selected files comprising one or more predefined features, in a response to a request to retrieve the selected files from the network devices communicated to said access network computer through a user interface, may be retrieved using the GAPI based on the meta-data which is properly updated within a predetermined period of time to subsequently store the retrieved files in a memory comprised in the access network computer, and/or to send the retrieved (selected) files to a requested destination in the computer network or to an outside computer network, and to update the meta-data for the retrieved files if necessary.

According to a further embodiment, the selected files comprising the one or more predefined features, in a response to a request to retrieve the selected files from the network devices for backup or archiving communicated to the access network computer through a user interface, may be retrieved using the GAPI based on the meta-data which is properly updated within a predetermined period of time to subsequently store the retrieved files in one or more repositories comprised in the computer network, and to update the meta-data for the retrieved files if necessary.

FIGS. 1-7 demonstrate more specific examples for implementing various embodiments of the present invention.

FIG. 1 shows an example among others of a block diagram of a computer network 12 comprising an access network computer 10 (or in general one or more access network computers) for implementing embodiments of the present invention. The computer network 12 may send searching and/or retrieving signals 22 to network devices, such as servers 14-1, 14-2, . . . , 14-N, workstations 16-1, 16-2, . . . , 16-M, 18-1, 18-2, . . . , 18-K, . . . , 20-1, 20-2, . . . , 20-P, and one or more archive and/or backup repositories 24, etc., for implementing embodiments disclosed herein, including (but not limited to): reading files (created using a plurality of applications) stored in the network devices, creating meta-data for the read files and storing the meta-data in the access network computer 10, retrieving selected files from the network devices, e.g., using the created meta-data, and storing these retrieved files in a memory of the access network computer 10, or in the one or more archive and/or backup repositories 24, or sending these retrieved files to a desired destination within the computer network 12 or outside of the computer network 12. It is noted that searching and/or retrieving signals 22 may be transmitted through a wired or wireless connections between the access network computer 10 and the network devices as shown in FIG. 1.

Figure 2:
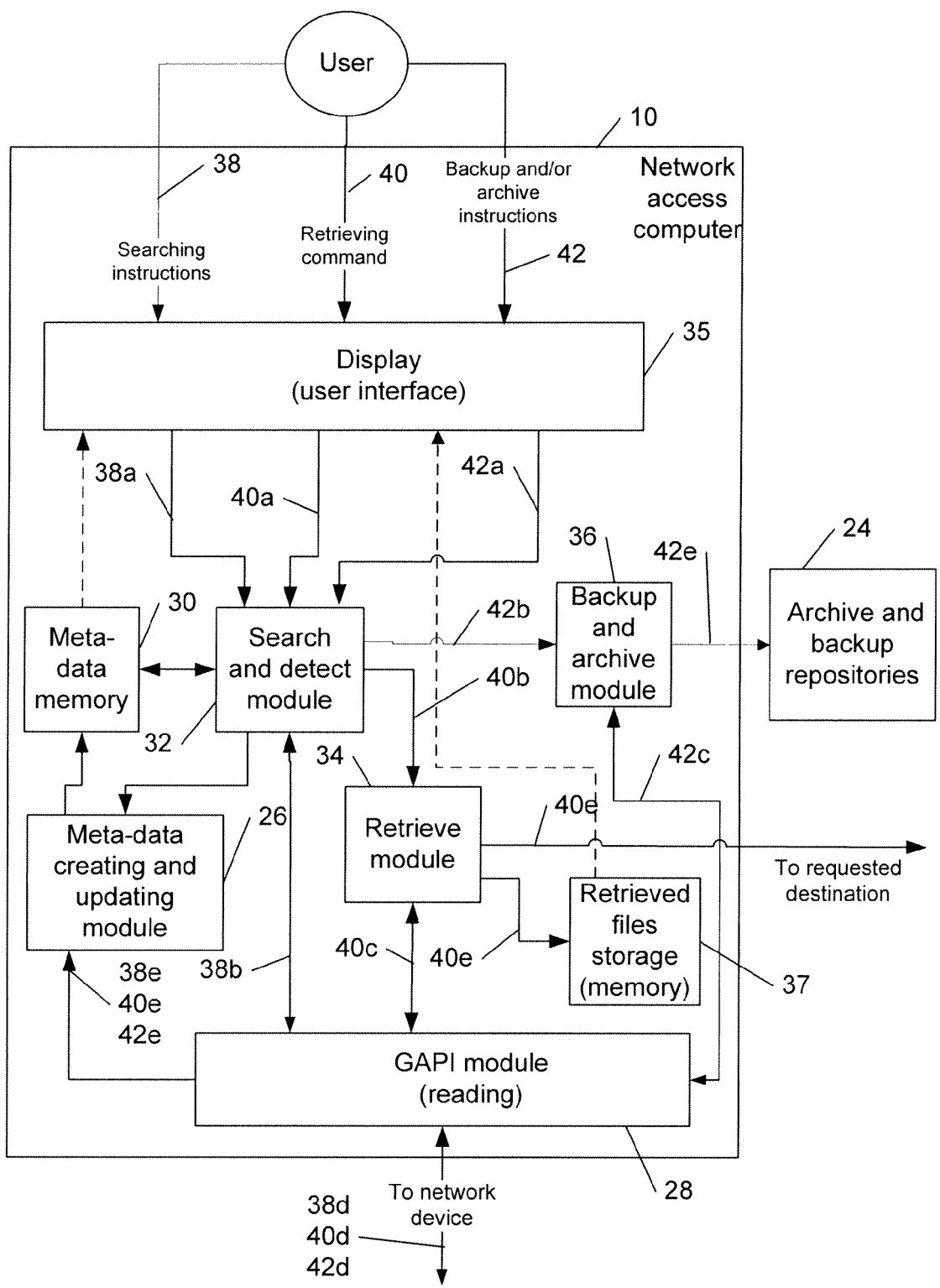
FIG. 2 is a block diagram of an access network computer comprising a generic application programming interface (GAPI), according to an embodiment of the present invention.

FIG. 2 shows an example among others of a block diagram of the access network computer 10 comprising a generic application programming interface (GAPI) module 28 (or reading files module) according to an embodiment of the present invention. The GAPI module 28 may read in the network devices of the a computer network 12 multi-application files (i.e., files created by two or more applications), for example, all files or requested selected files comprising one or more predefined features out of the plurality of files created using two or more applications and stored in the network devices of the computer network 12.

The access network computer 10 may also comprise a user interface and/or display 35 which may be used for entering user's commands: e.g., command 38 to search for all files or selected filed comprising one or more predefined features in the network devices and to create or update meta-data for these files, command 40 for retrieving selected files (e.g., comprising one or more predefined features) from the network devices, or command 42 to backup and/or archive files (e.g., comprising one or more predefined features) from the network devices which are forwarded as corresponding signals 38a, 40a or 42a to the search and detect module 32, and/or for possible viewing (e.g., displaying on the display/user interface 35) retrieved files and created meta-data files, e.g., stored in a retrieved files storage memory 37 or in a meta-data memory 30 (it is noted that, in general, a user interface and display 35 may be implemented as two different modules).

Moreover, the search and detect module 32, in response to corresponding request signal 38a, 40a or 42a, may determine whether the meta-data for the requested files comprising one or more predefined features is already exist (i.e., stored in the meta-data memory 30) and properly updated (e.g., within a predetermined time period). If this is the case, (i.e., the meta-data exists and properly updated for the requested files), the module 32 may stop the process in response to the command signal 38a, or, in response to the command signal 40a or 42a, the module 32 may provide meta-data information about the location of requested files (see signals 40b and 42b) to corresponding modules 34 (for retrieving) or 36 (for backup and archive), which may forward corresponding instruction messages (see signals 40c and 42c) to the GAPI module 28 for retrieving (see signals 40d or 42d) of these files.

However, if the meta-data does not exist or not properly updated for all or some of the requested files comprising one or more predefined features, then the module 32 in response to the signal 38a may provide corresponding searching instruction signal 38b, e.g., specifying the one or more predefined features of files to search for creating meta-data, to the GAPI module 28 which may provide then a search signal 38d for reading the requested files as disclosed herein (optionally the module 32 may also provide instructions signal for creating corresponding meta-data with corresponding characteristics to a meta-data creating and updating module 26, e.g., these instructions may be comprised in the original searching command 38). Also the search and detect module 32, in response to the command signal 40a or 42a, may provide instruction signals 40b or 42b comprising an indication that meta-data for the requested (or some of the requested) files does not exist to corresponding modules 34 (for retrieving) or 36 (for backup and archive), which then may forward corresponding signals 40c or 42c to the GAPI module 28 for retrieving (see signals 40d or 42d) and creating/updating (see signals 40e or 42e) the meta-data for the retrieved files comprising one or more predefined features.

According to a further embodiment, the meta-data creating and updating module 26, in response to received corresponding information signal 38e, 40e or 42e from the GAPI module 28 which comprise information read (or retrieved) by the GAPI module 28 in response to corresponding signals 38d, 40d or 42d, may create a desired meta-data and store it in the meta-data memory 30, as described herein. Moreover, the requested files retrieved by the GAPI 28 in response to the corresponding signals 40d or 42d may be forwarded by the GAPI module 28 to the corresponding modules 34 or 36, respectively, wherein the module 34 may send the retrieved files to a retrieved file storage (memory) 37 and/or to a requested destination (in the computer network 12 or outside of the computer network), and the module 36 may send the retrieved files to archive and backup repositories 24.

According to another embodiment, the meta-data can be created by the access network computer 10 by default without any request: e.g., the module 32 may initiate meta-data creation and periodic updating (e.g., within 24 hours) of this meta-data using (for all or selected files stored in the network devices of the computer network 12) reading the corresponding files by the GAPI module 28, creating meta-data by using the meta-data creating and updating module 26 and storing the created meta-data in the meta-data memory 30, as disclosed herein.

According to an embodiment of the present invention, the modules 26, 28, 32, 34 or 36 may be implemented as a software or a hardware module or a combination thereof. Furthermore, the modules 26, 28, 32, 34 and 36 may be implemented as a separate block or may be combined with any other module/block of the access network computer 10 or it may be split into several blocks according to their functionality. Moreover, it is noted that all or selected modules of the access network computer 10 may be implemented using an integrated circuit.

According to another embodiment, the access network computer 10 may be configured to process erased files. For example, the search and detect module 32 may receive, in response to the signal 38b, an update list of network device and files scanned. Then the module 32 may use this new list of content to compare to the current information comprised in the meta-data memory 30 to determine whether a description of a particular device or a particular file exists in the meta-data memory 30 but doesn't exist in the received update list. If such device or file is found, the module 32 may update the meta-data memory 30, indicating for this found description of the device, or file, that it (device or file) has been erased. Then when the module 32 may process signal 40a or 42a signal (for retrieving, backup or archiving), it may look in the meta-data memory 30 and determine if the description of the requested device or file is indicated as being erased, and if the description of the requested device or file is being erased, to further determine if this description of the erased device or file has been backed up or archived previously. Then if this is the case, the module 32 may retrieve the desired content in regard to the requested device or file from the archive or backup repositories such that this desired content may be sent, e.g., to a requested destination (e.g., see signal 40e in FIG. 2).

Figure 3:
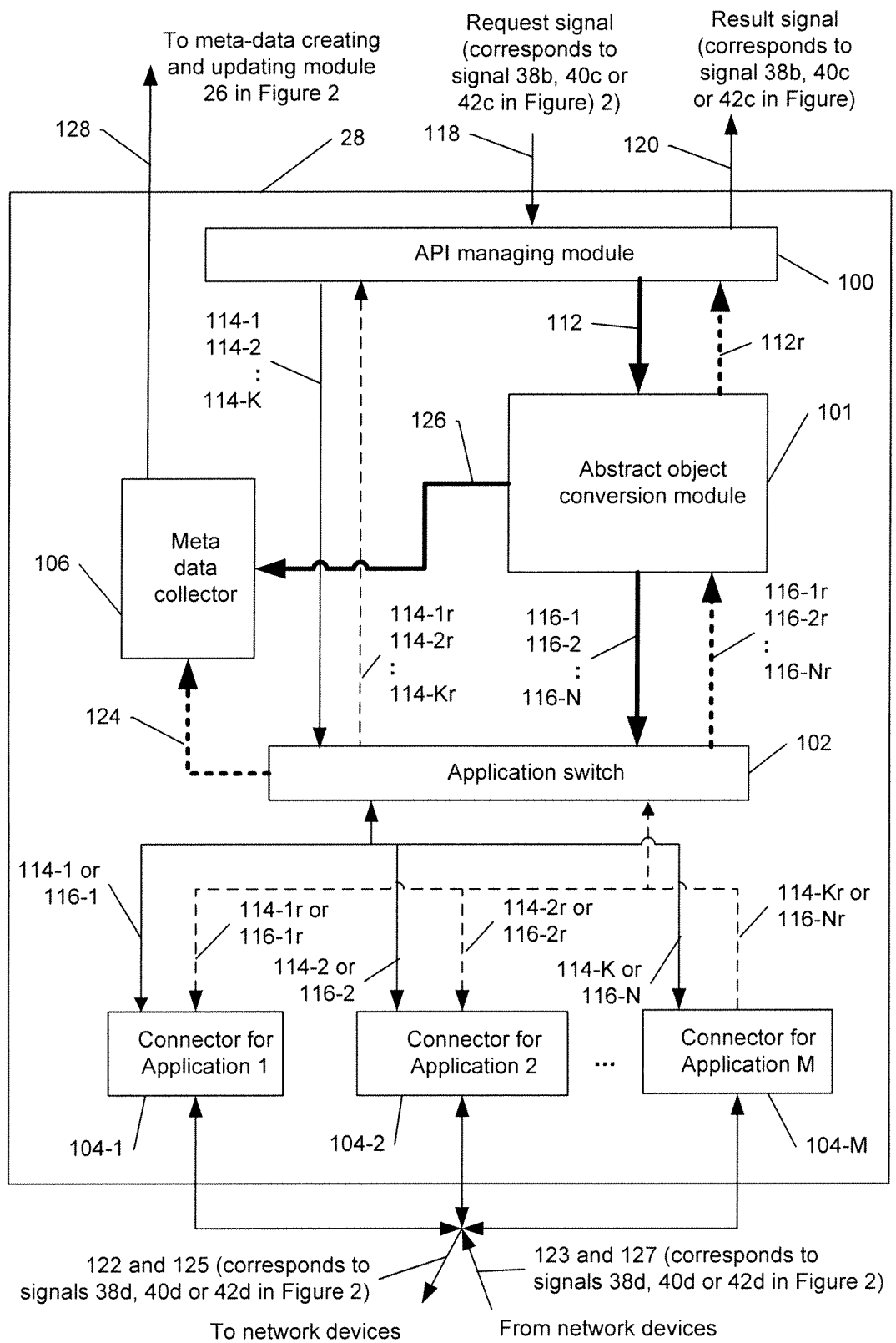
FIG. 3 is a block diagram of a generic application programming interface (GAPI), according to an embodiment of the present invention.

FIG. 3 shows an example among others of a block diagram of a generic application programming interface (GAPI) 28, according to an embodiment of the present invention. More detailed information about the GAPI 28 may be found in co-pending, co-owned application, having Ser. No. 12/687,667, and filed, Jan. 14, 2010, on even date herewith.

A request signal 118 (which may correspond to the signal 38b, 40c or 42c in FIG. 2) comprising a request for reading one or more files of a plurality of files for implementing a predetermined task (e.g., to search, to retrieve, to backup and/or archive information, create meta-data, etc.) may be provided, e.g., to an API (application programming interface) managing module 100 comprised in the GAPI 28, wherein the plurality of the files (e.g., e-mails) may be created using a plurality of applications, and the request or a part of the request does not comprise application-specific information. As disclosed herein, the multi-application files (i.e., files created by two or more applications) which may be read by the GAPI 28 may be created using a plurality of known applications, e.g., MICROSOFT OUTLOOK, EUDORA, MOZILLA THUNDERBIRD, IBM LOTUS NOTES, MAIL FOR MAC OS X, any software for e-mail that uses MBOX formats to store local e-mails, etc.

It is noted that for the purposes of the present invention, the term "application-specific information" means that the request signal received by the GAPI would comprise information formulated using a specific application (see examples presented in co-pending, co-owned application, having Ser. No. 12/687,667, and filed, Jan. 14, 2010, on even date herewith). If the request signal does not comprise such "application specific information", but comprise "additional information", e.g., meta-data regarding certain applications, then this information is defined as "application-related information" for the purposes of the present invention.

It is further noted that the API management module 100 may be configured to generate, in response to said request signal, an application independent request signal 112 corresponding to the request or to the part of the request not comprising the application-specific information, and to provide said application independent request signal 112 to an abstract object conversion module 101. Then the abstract object conversion module 101 may convert the application independent request signal (not comprising the application-specific information) into one or more application command signals 116-1, 116-2, . . . , 116-N (wherein N is an integer of a value of one or more) comprising the application-specific information, wherein each signal of these one or more application command signals 116-1, 116-2, . . . , 116-N may define a corresponding command for one application of the plurality of the applications.

The application switch 102 may be configured to provide each of the one or more application command signals 116-1, 116-2, . . . , 116-N comprising the application-specific information to one of corresponding one or more application connectors of a plurality of application connectors 104-1, 104-2, . . . , 104-M (wherein M is an integer of two or more and is larger than or equal to N) comprised in the GAPI 28 for reading all or selected files of the one or more files of said plurality of files to fully or partially implement the predetermined task, as described herein, wherein each application connector of the plurality of the application connectors 104-1, 104-2, . . . , 104-N may be configured to read files created using one of the plurality of the applications 1, 2, . . . N. As described herein, the applications may include but are not limited to, e.g., MICROSOFT OUTLOOK, EUDORA, MOZILLA THUNDERBIRD, IBM LOTUS NOTES, MAIL FOR MAC OS X, any software for e-mail that uses MBOX formats to store local e-mails, etc Then these corresponding one or more application connectors of the plurality of application connectors 104-1, 104-2, . . . , 1-4-N comprised in the GAPI 28, in response to the corresponding one or more application command signals 116-1, 116-2, . . . , 116-N, may be configured to provide corresponding one or more reading signals 122 for reading the all or selected files of the one or more files of the plurality of files and collect a raw information signal 123 comprising application-specific raw information for objects stored in the all or selected files of the one or more files of the plurality of files in response to one or more reading signals 122 (signals 122 and 123 may corresponds to signals 38d, 40d or 42d in FIG. 2). The raw information collected by the GAPI 28 typically defines a property which is known by one of the application connectors 104-1, 104-2, . . . , 1-4-M. Objects stored in the files may be e-mails, contacts, calendaring items. If the object is an email, the raw information may be an originator address, one or more recipients addresses, a subject or any other property stored with the email. If the object is a contact, the raw information may be the name of the contact, the email of any other property stored with the email. If the object is a calendaring item, the raw information may be the date and time of the event, the originator address, the attendees' addresses or any other property stored with the calendaring item.

Once the raw information is collected by one or more application connectors of the plurality of application connectors 104-1, 104-2, . . . , 104-M, each of these one or more application connectors may be configured to create a response comprising the collected raw information and forward it to the application switch 102 which may combine all responses 116-1r, 116-2r, . . . , 116-Nr and further forward them to the abstract object conversion module 101, which may convert the raw information signals into an information signal 112r not comprising the application-specific raw information, which then may be forwarded as a result signal 120 or a part of the result signal 120 (which may correspond to the signal 38b, 40c or 42c in FIG. 2) to a sender (e.g., to the module 32, 34 or 36 in FIG. 2) of the request signal 118, according to an embodiment of the present invention.

In addition, the abstract object module 101 may be configured to generate a meta-data signal 126 not comprising the application-specific information (e.g., meta-data may be requested, e.g., in the request signal 118 or in the part of the request signal 118, or performed as a default) for creating or updating meta-data using this application-specific raw information and forward the meta-data signal 126, e.g., to a meta-data collector 106, which may further forward it to a meta-data creating and updating module, e.g., module 26 in FIG. 2 (or in general, e.g., to a host computer comprising the GAPI 28).

In another, embodiment r, if only the part of the request signal 118 does not comprise the application-specific information but a remaining part of the request comprises the application-specific information for one or more applications of the plurality of the applications, then the API managing module 100 may be configured to generate one or more further application command signals 114-1, 114-2, . . . , 114-K (wherein K is an integer of a value of one or more and less than M) in response to this remaining part of the request signal 118, and to provide these one or more further application command signals 114-1, 114-2, . . . , 114-K to the application switch 102 which may be configured to provide the one or more further application command signals 114-1, 114-2, . . . , 114-K to corresponding one or more further application connectors (which may be different than the corresponding one or more application connectors disclosed herein) of the plurality of application connectors 104-1, 104-2, . . . , 104-M for reading all or further selected files of the one or more files of the plurality of files to fully implement the predetermined task.

Further processing of the one or more further application command signals 114-1, 114-2, . . . , 114-K is similar to the processing of the one or more application command signals 116-1, 116-2, . . . , 116-N. The corresponding one or more application connectors of the plurality of application connectors 104-1, 104-2, . . . , 1-4-N comprised in the GAPI 28, in response to the one or more further application command signals 114-1, 114-2, . . . , 114-K, may be configured to provide corresponding one or more reading signals 125 for reading the all or selected files of the one or more files of the plurality of files and to collect a further raw information signal 127 comprising a further application-specific raw information for further objects (which are similar to objects defined herein) stored in the all or selected files of the one or more files of the plurality of files in response to one or more further reading signals 125 (signals 125 and 127 may corresponds to signals 38d, 40d or 42d in FIG. 2). This further raw information collected by the GAPI 28 typically defines a property which is known by one of the application connectors 104-1, 104-2, . . . , 1-4-M. Further objects stored in files may be e-mails, contacts, calendaring items, as described herein. If the object is an email, the raw information may be an originator address, one or more recipients addresses, a subject or any other property stored with the email. If the object is a contact, the raw information may be the name of the contact, the email of any other property stored with the email. If the object is a calendaring item, the raw information may be the date and time of the event, the originator address, the attendees' addresses or any other property stored with the calendaring item.

Once the further raw information is collected by one or more further application connectors of the plurality of application connectors 104-1, 104-2, . . . , 104-M, each of these one or more further application connectors may be configured to create a response comprising the collected raw information and forward it to the application switch 102 which may combine all responses 114-1r, 114-2r, . . . , 114-Kr and further send them to the API managing module 100, which then may forward these responses as a part of the result signal 120 (which may correspond to the signal 38b, 40c or 42c in FIG. 2) to a sender (e.g., the module 32, 34 or 36 in FIG. 2) of the request signal 118, according to the embodiment of the present invention disclosed herein.

In addition, the application switch 102 may be configured to generate a further meta-data signal 124 (e.g., meta-data may be requested, e.g., in the request signal 118 or in the part of the request signal 118, or performed as a default) for creating or updating the further meta-data using this further application-specific raw information and forward it, e.g., to a meta-data collector 106, which may further forward it to the meta-data creating and updating module, e.g., module 26 in FIG. 2 (or in general, e.g., to a host computer comprising the GAPI 28).

According to an embodiment of the present invention, the module 100, 101, 102, 106, 104-1, 104-2, . . . , or 104-M of the GAPI 28 may be implemented as a software module. However, other implementations using hardware (e.g., module 106 may include a small memory for temporary storing the collected meta-data before combining, or the GAPI 28 may comprise a small processing/storing memory for facilitating some steps performed by the GAPI 28) and a combination of software and hardware are conceivable as well. Furthermore, the module 100, 101, 102, 106, 104-1, 104-2, . . . , or 104-M may be implemented as a separate block or may be combined with any other modules/blocks of the GAPI 28 (for example, modules 100 and 101 may be combined, or modules 100, 101 and 102 may be combined) or it may be split into several blocks according to their functionality. If modules 100 and 101 are combined, then additional generating of the application independent request signal 112 may not be necessary.

FIGS. 4-7 are flow chart examples further demonstrating different embodiments for implementing different implementation scenarios of the present invention.

Figure 4:
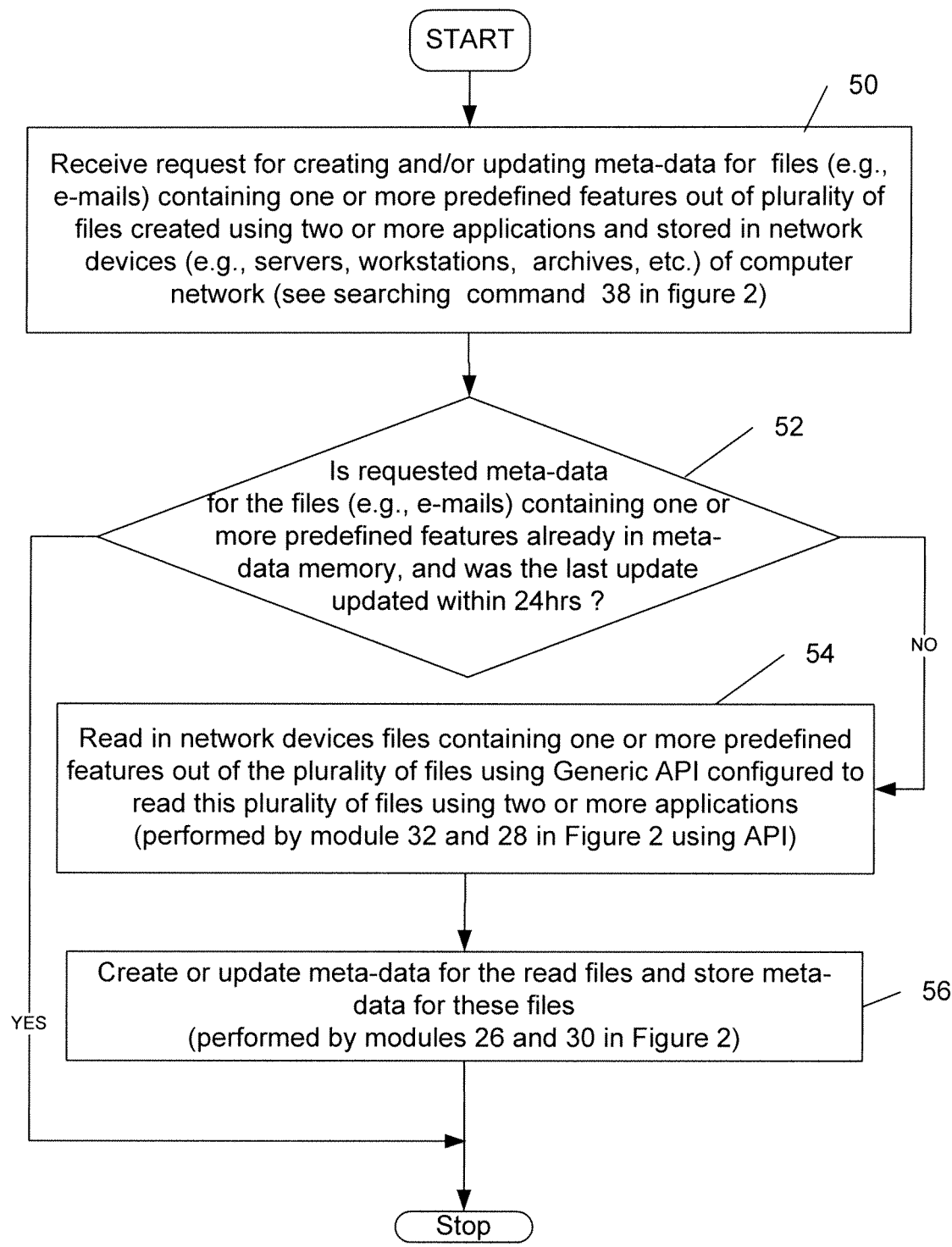
FIG. 4 is a flow chart for implementing meta-data creation upon request, according to an embodiment of the present invention.

FIG. 4 shows an example of a flow chart for implementing meta-data creation and/or updating, e.g., in the computer network 12 shown in FIG. 1, upon request using the access network computer 10, according to an embodiment of the present invention. The flow chart of FIG. 4 only represents one possible scenario among others. It is noted that the order of steps shown in FIG. 4 is not absolutely required, so in principle, the various steps may be performed out of order.

In a method according to the embodiment of the present invention, in a first step 50, a request (see searching command 38 in FIG. 2) for creating and/or updating meta-data for files (e.g., e-mails) containing one or more predefined features out of a plurality of files created using two or more applications and stored in the network devices (e.g., servers, workstations, archives, etc.) of the computer network (e.g., the computer network 12 shown in FIG. 1) is received by the access network computer (e.g., searching command 38 may be communicated to the access network computer 10, e.g., through a user interface (e.g., display) 35 as shown in FIG. 2).

In a next step 52, it may be determined (e.g., by the access network computer 10 shown in FIG. 2) whether the requested meta-data for the files (e.g., e-mails) containing one or more predefined features already created and stored in the meta-data memory, and whether the last update was performed within a time period less than a predetermined time period (e.g., 24 hours). If that is the case, the process may stop. However, if it is determined that the requested meta-data for the files (e.g., e-mails) containing one or more predefined features is not created or the last update was not performed within a predetermined time period (e.g., 24 hours), in a next step 54, the files containing one or more predefined features out of the plurality of files stored in the computer network are read using the GAPI (e.g., module 28 shown in FIG. 2) which may be configured to read this plurality of files using the two or more applications.

In a next step 56, meta-data for the read files may be created or updated (e.g., using the modules 26 and 32 shown in FIG. 2) and stored (e.g., in the memory 30 shown in FIG. 2). It is further noted that periodic updating of the meta-data may be performed in response to the search command (e.g., searching command 38 shown in FIG. 2), i.e., the searching command 38 may comprise the request for periodic updating and the predefined time period or interval to perform the updating.

Alternatively, each updating of the meta-data may require a special request from the user. In yet another alternative, the updating may be pertained by the access network computer by default (e.g., without a special request for updating the meta-data in the searching command 38 shown in FIG. 2) as a build-in feature, which is related to the next example shown in FIG. 5.

Figure 5:
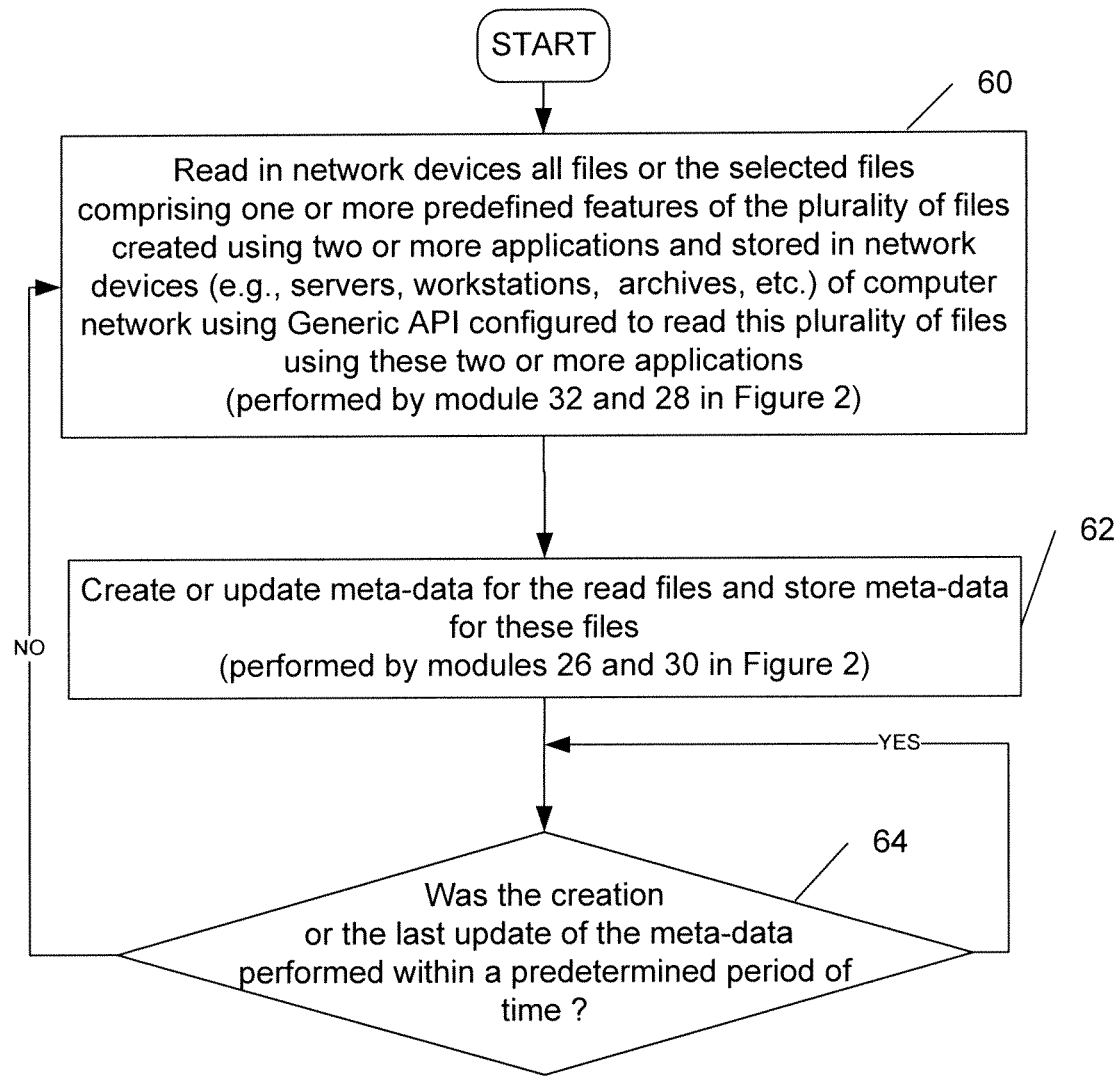
FIG. 5 is a flow chart for implementing meta-data creating and updating by default, according to an embodiment of the present invention.

FIG. 5 shows an example of a flow chart for implementing meta-data creating and/or updating by default without a request, e.g., in the access network computer 10 of the computer network 12 as shown in FIGS. 1-2, according to an embodiment of the present invention. The flow chart of FIG. 5 only represents one possible scenario among others. It is noted that the order of steps shown in FIG. 5 is not absolutely required, so in principle, the various steps may be performed out of order.

In a method according to the embodiment of the present invention, in a first step 60, all files or selected files comprising one or more predefined features of the plurality of files created using two or more applications and stored in network devices (e.g., servers, workstations, archives, etc.) of the computer network (e.g., the computer network 12 shown in FIGS. 1-2) may be read using GAPI (e.g., module 28 shown in FIG. 2) which may be configured to read this plurality of files using these two or more applications (this step may be performed by the by module 32 and 28 in FIG. 2).

In a next step 62, meta-data for the read files may be created or updated (e.g., using the module 26 shown in FIG. 2) and stored (e.g., in the memory 30 shown in FIG. 2). It is further noted that reading files and creating and/or updating periodic updating the meta-data may be performed in step 60 and 62 by default without any request from the user.

In a next step 64, it is determined whether the creation of the meta data was performed and the last update of the meta-data was performed within a predetermined period of time. If that is the case, the process may keep repeating step 64. However, if it is determined that the creation of the meta-data was not performed and/or the last update of the meta-data was not performed within a predetermined time period, the process goes back to step 60 to repeat reading (searching) the files and subsequently updating the meta-data for the read files.

Figure 6:
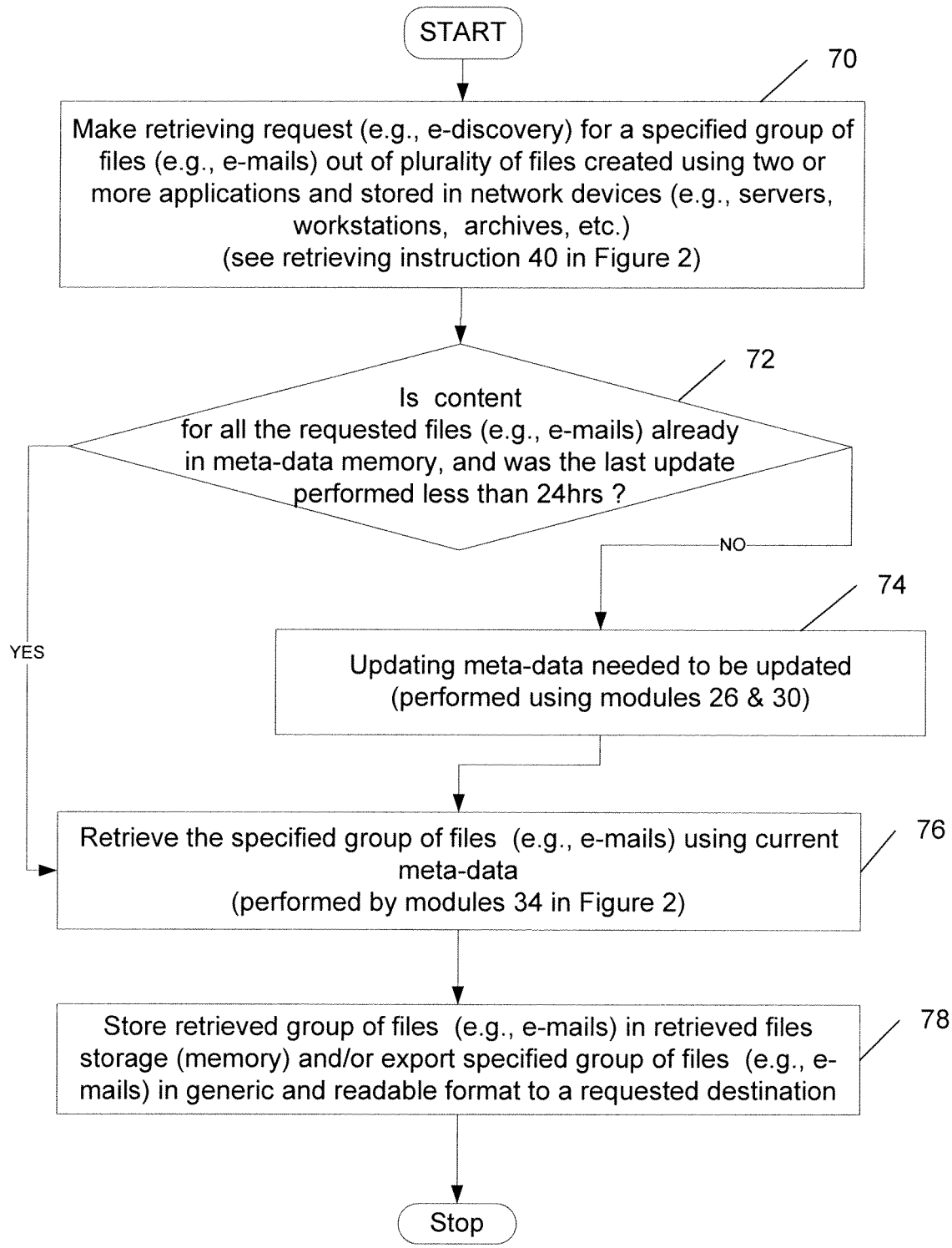
FIG. 6 is a flow chart for retrieving and storing/exporting specified files using meta-data or files having a specified property, according to an embodiment of the present invention.

FIG. 6 is an example of a flow chart for retrieving and storing/exporting specified files using meta-data or files having a specific property using the access network computer 10 of the computer network 12 as shown in FIGS. 1-2, according to an embodiment of the present invention. The flow chart of FIG. 6 only represents one possible scenario among others. It is noted that the order of steps shown in FIG. 6 is not absolutely required, so in principle, the various steps may be performed out of order.

In a method according to the embodiment of the present invention, in a first step 70, a retrieving request (see a retrieving command 40 in FIG. 2), e.g., e-discovery, for a specified group of files (e.g., e-mails) out of the plurality of files created using two or more applications and stored in network devices (e.g., servers, workstations, archives, etc.) is made, e.g., to the access network computer 10 of the computer network 12 as shown in FIG. 2.

In a next step 72, it may be determined (e.g., by the access network computer 10) whether the meta-data for the requested files (e.g., e-mails) containing one or more predefined features already created and stored in the meta-data memory, and whether the last update was performed within a time period less than a predetermined time period (e.g., 24 hours). If that is the case, the process goes to step 76. However, if it is determined that the meta-data for the requested files (e.g., e-mails) or for some of the requested files containing one or more predefined features is not created or the last update was not performed within a predetermined time period (e.g., 24 hours), in a next step 74, meta-data may be updated for these requested files or for some of the requested files (e.g., using modules 26 and 30 shown in FIG. 2, as disclosed herein in reference to step 56 in FIG. 4).

In a next step 76, the specified group of files (e.g., e-mails) is retrieved using the current meta-data (existed, created or updated for the specified group of files), e.g., using the module 34 with assistance of the module 32 and the GAPI module 28, as disclosed herein.

In a next (e.g., final) step 78, the retrieved group of files (e.g., e-mails) may be stored in a retrieved files storage memory (e.g., in memory 36 shown in FIG. 2) and/or may be exported in a generic and readable format to a requested destination (within or outside of the computer network 12 shown in FIG. 1). It is further noted that after storing the retrieved group of files in the retrieved files storage memory 36, the meta-data for this retrieved group of files may be further updated (e.g., using modules 26 and 30 shown in FIG. 2) to include a new location of the files stored in the retrieved files storage memory 36.

Figure 7:
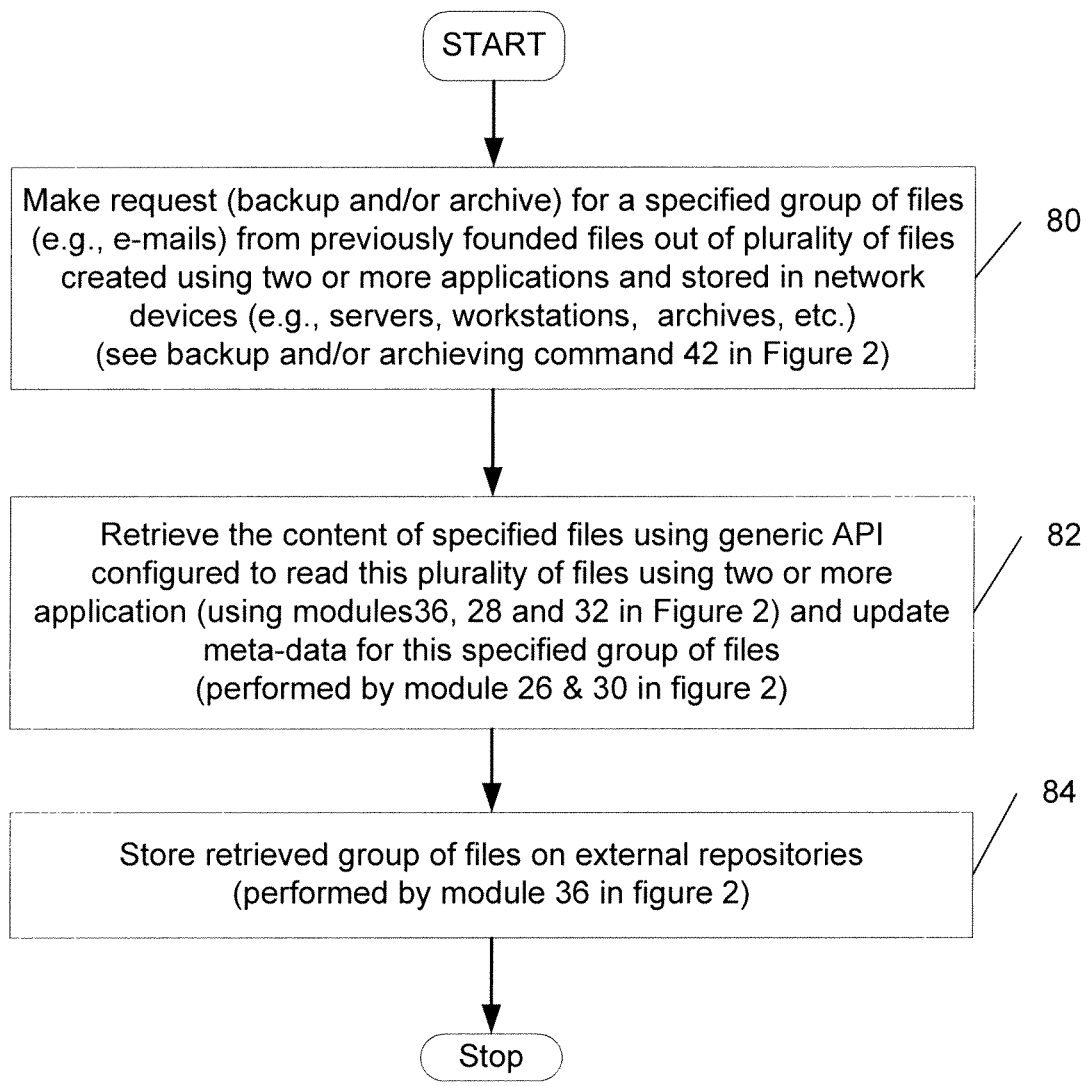
FIG. 7 is a flow chart for retrieving and backing up/archiving specified files using existed valid meta-data for these files, according to an embodiment of the present invention.

FIG. 7 is an example of a flow chart for retrieving and backing up/archiving specified files using meta-data created for these files, e.g., using the access network computer 10 of the computer network 12 as shown in FIGS. 1-2, according to an embodiment of the present invention. The flow chart of FIG. 7 only represents one possible scenario among others. It is noted that the order of steps shown in FIG. 7 is not absolutely required, so in principle, the various steps may be performed out of order.

In a method according to the embodiment of the present invention, in a first step 80, a backup and/or archiving request (see backup and/or archiving command 42 in FIG. 2) of a specified group of files (e.g., e-mails) from previously founded files out of plurality of files created using two or more applications and stored in network devices (e.g., servers, workstations, archives, etc.) may be received, e.g., by the access network computer 10 of the computer network 12 as shown in FIG. 2.

In a next step 82, the specified group of files (e.g., e-mails) may be retrieved from the founded files using current meta-data, e.g., using the module 36 with assistance of the module 32 and the GAPI module 28, as disclosed herein. It this example, it is assumed that the meta-data for the requested specified group of files exists and properly update (e.g., within 24 hours). It is further noted that in the example of FIG. 7, the meta-data may provide all needed information for retrieving the specified group of files, but if this meta-data does not exist for all requested files or not properly updated (e.g., not with a predetermined time period), then additional steps like steps 72 and 74 in FIG. 6 may be used for creating/updating the meta-data for this specified group of files.

Then in next (e.g., final) step 84, the retrieved group of files (e.g., e-mails) may be stored (backup or archived) in external repositories such as archives and backup repositories, e.g., shown as module 24 in FIG. 2. It is further noted that after storing the specified group of files in the in external repositories 24, the meta-data for this specified group of files may be further updated (e.g., using modules 26 and 30 shown in FIG. 2) to include a new location of the files stored in these external repositories 24.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention may be provided as a computer program product comprising a computer readable medium or a computer readable storage structure embodying a computer program code (i.e., the software or firmware) thereon for execution by a computer processor.

It is noted that various embodiments of the present invention recited herein may be used separately, combined or selectively combined for specific applications.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

The invention claimed is:

1. A method, comprising:

receiving, at a generic application programming interface using a network accessible computer processor, a request signal comprising one or more simultaneous request for searching all files, or selected files comprising one or more predetermined features, from among a plurality of files stored in one or more devices and created using two or more applications;

determining if said request signal, or a part of said request signal, is absent application-specific information, said generic application programing interface further configured to perform:

searching for and detecting application meta data for said all files, or said selected files;

reading each of said all files, or said selected files, and converting said request signal absent application-specific information, or said part of the request signal absent application-specific information, to one or more application command signals comprising said application-specific information derived from application meta data and combined responses of raw application file information corresponding to said all files, or said selected files, each signal of said one or more application command signals defining a corresponding application command for one application of said two or more applications, and providing said one or more application command signals concurrently to corresponding one or more application connectors within said generic application programming interface for concurrently performing one or more of the following:

creating or updating meta-data comprising one or more characterization records for each of said all files, or said selected files, retrieving said all files, or said selected files, and providing for viewing on a display one or more files of said all files, or said selected files, using said two or more applications, or providing for viewing on a display said meta-data.

2. The method of claim 1, wherein said retrieving said all files, or said selected files, is performed:

by using said meta-data if said meta-data is already created and updated within a predetermined time period, or by creating or updating said meta-data if said meta-data is not created or not updated within a predetermined time period.

3. The method of claim 1, further comprising:

storing said meta-data in said network access computer, wherein said reading, creating or updating are performed by said network access computer if the meta-data for said all files, or said selected files, was not previously created or updated within a predetermined time period.

4. The method of claim 3, said predetermined time period is 24 hours.

5. The method of claim 1, wherein said reading said all files, or said selected files, and said creating or updating meta-data for said read all files, or said read selected files, are performed by said network access computer in response to a request to create or update said meta-data for said all files, or said selected files, communicated to said network access computer through a user interface.

6. The method of claim 1, wherein said searching, detecting, and reading said all files, or said selected files, and said creating or updating meta-data are performed as a default without any request, wherein said updating is performed periodically with a predetermined time period.

7. The method of claim 1, wherein said network access computer is configured to process erased files.

8. The method of claim 1, wherein said network devices comprised in said computer network are one or more of: workstations, servers, archiving storage devices, and backup storage devices.

9. The method of claim 1, wherein said meta-data comprising one or more characterization records of said all files, or said selected files, indicates for each file one or more of:

(a) a location of said each file, (b) a content of said each file, (c) an author of said each file, and further indicating for said each file, if said each file is an e-mail, one or more of:

(d) an originator address, (e) a recipient address, (f) having attachment or not, and wherein said characterization records comprise one or more of:

(i) at least one index of content of said each file, (ii) one or more summaries using selected characteristics, and (iii) at least one aggregated summary combining said one or more summaries.

10. The method of claim 1, wherein said selected files are e-mails.

11. The method of claim 1, further comprising:

receiving a request to retrieve said selected files, said request being communicated to said network access computer through a user interface; and retrieving said selected files by said network access computer in response to said request based on said meta-data which is created and updated within a predetermined period of time, and using said generic application programming interface to perform one or both of: storing said selected files in a memory comprised in said network access computer, and sending said selected files to a requested destination in said computer network or to an outside computer network.

12. The method of claim 1, further comprising:

receiving a request to retrieve said selected files for backup or archiving and communicated to said network access computer through a user interface;

retrieving said selected files by said network access computer in response to said request based on said meta-data which is created and updated within a predetermined period of time, and using said generic application programming interface;

storing said selected files in repositories comprised in said computer network; and updating the meta-data for said selected files.

13. The method of claim 1, wherein said two or more applications are MICROSOFT OUTLOOK, EUDORA, MOZILLA THUNDERBIRD and IBM LOTUS NOTES.

14. A network access computer, comprising:
a generic application programming interface, operating on a processor of the network access computer, configured to receive a request signal comprising one or more simultaneous requests for searching all files, or selected files comprising one or more predetermined features, from among a plurality of files stored in one or more devices and created using two or more applications;
determining if said request signal, or a part of said request signal, is absent application-specific information, said generic application programming interface further configured to perform:
searching for and detecting application meta data for said all files, or said selected files;
reading each of said all files, or said selected files, and converting said request signal absent application-specific information, or said part of the request signal absent application-specific information, to one or more application command signals comprising said application-specific information derived from application meta data and combined responses of raw application file information corresponding to said all files, or said selected files, each signal of said one or more application command signals defining a corresponding application command for one application of said two or more applications, and
providing said one or more application command signals concurrently to corresponding one or more application connectors within said generic application programming interface for concurrently performing one or more of the following:
creating or updating meta-data comprising one or more characterization records for each of said all files, or said selected files,
retrieving said all files, or said selected files, and
providing for viewing on a display one or more files of said all files, or said selected files, each using said two or more applications, or providing for viewing on a display said meta data.

15. The network access computer of claim 14, further comprising:
a meta-data creating and updating module, configured to create or update meta-data for read files out of said all files, or selected files, which are read using said generic application programming interface, if the meta-data for said read files was not previously created or if the meta-data for said read files was not updated within a predetermined time period; and
a meta-data memory, configured to store said meta-data.

16. The network access computer of claim 15, said predetermined period of time is 24 hours.

17. The network access computer of claim 14, further comprising:
a user interface, configured to receive a request to create or update said meta-data for said all files, or said selected files comprising one or more predefined features;
a search and detect module, responsive to said request, configured to determine if the meta-data for said selected files was not previously created or was not updated within a predetermined time period, and, if the meta-data for said selected files was not previously created or updated within said predetermined time period, configured to provide said request further to said generic application programming interface for reading said all files, or said selected files, to create or update said meta-data for said all files, or said selected files.

18. The network access computer of claim 14, wherein said searching, detecting, and reading and updating said meta-data for said all files, or said selected files, is performed periodically every predetermined time period by default without any request.

19. The network access computer of claim 14, wherein said network access computer is configured to process erased files.

20. The network access computer of claim 14, wherein said network devices comprised in said computer network are one or more of: workstations, servers, archiving storage devices, and backup storage devices.

21. The network access computer of claim 14, wherein said meta-data comprising one or more characterization records of said all files, or said selected files, indicates for each file one or more of:
(a) a location of said each file,
(b) a content of said each file,
(c) an author of said each file, and further indicating for said each file, if said each file is an e-mail, one or more of:
(d) an originator address,
(e) a recipient address,
(f) having attachment or not, and wherein said characterization records comprise one or more of:
(i) at least one index of content of said each file,
(ii) one or more summaries using selected characteristics, and
(iii) at least one aggregated summary combining said one or more summaries.

22. The network access computer of claim 14, wherein said selected files are e-mails.

23. The network access computer of claim 14, further comprising:
a retrieve module, responsive to a request to retrieve said selected files comprising said one or more predefined features communicated to said network access computer through a user interface; configured to provide retrieving of said selected files by said network access computer in response to said request based on said meta-data which is created and updated within a predetermined period of time and using said generic application programming interface, and further configured to send said selected files after being retrieved to a further destination; and
a retrieved files storage memory, configured to store said selected files after being retrieved.

24. The network access computer of claim 14, further comprising:
a backup and archive module, responsive to a request to retrieve said selected files comprising said one or more predefined features for backup or archiving and communicated to said network access computer through a user interface, and configured to provide retrieving of said selected files by said network access computer in response to said request based on said meta-data which is created and updated within a predetermined period of time and using said generic application programming interface, for providing said selected files for storing to an archive and backup repositories located in said computer network but outside of said network access computer.

25. The network access computer of claim 14, wherein said two or more applications are MICROSOFT OUTLOOK, EUDORA, MOZILLA THUNDERBIRD and IBM LOTUS NOTES.

26. A non-transitory computer readable storage medium encoded with a computer program comprising computer readable instructions recorded thereon, that when executed by a processor cause:

receiving, at a generic application programming interface using a network accessible computer processor, a request signal comprising one or more simultaneous request for searching all files, or selected files comprising one or more predetermined features, from among a plurality of files stored in one or more devices and created using two or more applications;

determining if said request signal, or a part of said request signal, is absent application-specific information, said generic application programing interface further configured to perform:

searching for and detecting application meta data for said all files, or said selected files;

reading each of said all files, or said selected files, and converting said request signal absent application-specific information, or said part of the request signal absent application-specific information, to one or more application command signals comprising said application-specific information derived from application meta data and combined responses of raw application file information corresponding to said all files, or said selected files, each signal of said one or more application command signals defining a corresponding application command for one application of said two or more applications, and providing said one or more application command signals concurrently to corresponding one or more application connectors within said generic application programming interface for concurrently performing one or more of the following:

creating or updating meta-data comprising one or more characterization records for each of said all files, or said selected files, retrieving said all files, or said selected files, and providing for viewing on a display one or more files of said all files, or said selected files, using said two or more applications, or providing for viewing on a display said meta-data.

27. The non-transitory computer readable storage medium of claim 26, further comprising:

storing said meta-data in said network access computer, wherein said searching, detecting, and reading, creating or updating are performed if the meta-data for said all files or said selected files was not previously created or updated within a predetermined time period.

\* \* \* \* \*